(12) United States Patent
Kulprathipanja et al.

(10) Patent No.: US 7,344,585 B1
(45) Date of Patent: Mar. 18, 2008

(54) MIXED MATRIX MEMBRANE FOR GAS SEPARATION

(75) Inventors: Santi Kulprathipanja, Inverness, IL (US); Jidapa Soontraratpong, Muang (TH); Jeffrey J. Chiou, Irvine, CA (US)

(73) Assignee: UOP LLC, Des Plaines, IL (US)

( * ) Notice: Subject to any disclaimer, the term of this patent is extended or adjusted under 35 U.S.C. 154(b) by 204 days.

(21) Appl. No.: 11/216,823

(22) Filed: Aug. 31, 2005

(51) Int. Cl.
*B01D 53/22* (2006.01)

(52) U.S. Cl. ................................. 95/45; 96/4
(58) Field of Classification Search ............... 585/640; 95/45; 502/4; 96/4
See application file for complete search history.

(56) References Cited

U.S. PATENT DOCUMENTS

| | | | |
|---|---|---|---|
| 3,457,170 A | 7/1969 | Havens | 210/23 |
| 3,556,305 A | 1/1971 | Shorr | 210/490 |
| 3,862,030 A | 1/1975 | Goldberg | 210/24 |
| 3,878,104 A | 4/1975 | Guerrero | 210/323 |
| 3,993,566 A | 11/1976 | Goldberg et al. | 210/433 M |
| 4,032,454 A | 6/1977 | Hoover et al. | 210/323 R |
| 4,302,334 A | 11/1981 | Jakabhazy et al. | 210/500.2 |
| 4,341,605 A | 7/1982 | Solenberger et al. | 204/98 |
| 4,606,740 A | 8/1986 | Kulprathipanja | 55/16 |
| 5,127,925 A | 7/1992 | Kulprathipanja et al. | 55/16 |
| 6,726,744 B2 | 4/2004 | Kulprathipanja et al. | 95/45 |
| 6,756,516 B2* | 6/2004 | Mees et al. | 585/640 |
| 2003/0089227 A1* | 5/2003 | Hasse et al. | 95/45 |

* cited by examiner

*Primary Examiner*—Duane Smith
*Assistant Examiner*—Amber Miller-Harris
(74) *Attorney, Agent, or Firm*—Mark Goldberg

(57) ABSTRACT

An improved mixed matrix membrane for the separation of gases comprises a nitrogen containing compound such as an amine, silicone rubber and activated carbon on a porous support. The membrane may also comprise a carbonate such as potassium carbonate and a plasticizer such as polyethylene glycol. Membranes of this design may be used in processing natural gas or other gases. The gases which may be separated by the membrane include mixtures of methane and carbon dioxide, mixtures of oxygen and nitrogen, and mixtures of carbon dioxide and nitrogen.

17 Claims, No Drawings

MIXED MATRIX MEMBRANE FOR GAS SEPARATION

FIELD OF THE INVENTION

This invention pertains to mixed matrix membranes having improved selectivity in separation of gases. More particularly, the invention pertains to improved mixed matrix membranes in separation of carbon dioxide and methane.

BACKGROUND OF THE INVENTION

It is often necessary or desirable to separate gases such as oxygen and nitrogen from each other or from other gas mixtures. The utility of this can range from a need to remove oxygen from a stream of combustible gases, to remove nitrogen to increase the oxygen content of medical oxygen, to perform a separation in a petrochemical process or as part of a process for the production of pure gas streams. Another important gas separation is to remove carbon dioxide from natural gas.

Several techniques, including absorption into a solvent phase, pressure swing adsorption (PSA) and membrane separation have been developed for the purpose of performing these separations. Membrane separations are based upon the relative permeability of one gas molecule being much higher than that of another gas molecule through an otherwise impermeable membrane. Polymeric membranes have attracted a great deal of interest for use in gas separation. Some membranes which are used include silicone membranes for oxygen/nitrogen separation, cellulose acetate membranes for carbon dioxide removal from natural gas and silicone-coated polysulfone membranes for hydrogen recovery from various waste streams. In a typical operation, a pressure differential is maintained across the polymeric membrane to provide the driving force for the permeation. Two properties of the membrane are of critical importance in determining the performance characteristic, which is possessed by the membrane. The first property is the solubility of the gas in the membrane, while the second property is the diffusivity of the gas in the membrane material. The product of these two properties, that is, solubility and diffusivity, is called the permeability. The higher the membrane permeability, the more attractive is the use of membranes for a gas separation process.

The separation of a gas mixture utilizing a membrane is effected by passing a feed stream of the gas across the surface of the membrane. Since the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while the residue stream is enriched in the less permeable component of the feed.

There are various references which disclose the incorporation of various materials within separation membranes. U.S. Pat. No. 3,457,170 to Havens; U.S. Pat. No. 3,878,104 to Guerrero; U.S. Pat. No. 3,993,566 to Goldberg et al; U.S. Pat. No. 4,032,454 to Hoover et al; and U.S. Pat. No. 4,341,605 to Solenberger et al teach the use of structural supports or reinforcement fibers or fabrics to aid the membrane in resisting the high pressures used in the reverse osmosis process. U.S. Pat. No. 3,556,305 to Shorr shows a "sandwich" type reverse osmosis membrane comprising a porous substrate covered by a barrier layer, in turn covered by a polymer or film bonded to the barrier layer by an adhesive polymeric layer. U.S. Pat. No. 3,862,030 to Goldberg shows a polymeric matrix having an inorganic filler such as silica dispersed throughout which imparts a network of micro-voids or pores of about 0.01 to about 100 microns, capable of filtering microscopic or ultrafine particles of submicron size. U.S. Pat. No. 4,302,334 to Jakabhazy et al discloses a membrane "alloy" comprising a hydrophobic fluorocarbon polymer blended with polyvinyl alcohol polymer which imparts hydrophilic properties to the membrane.

U.S. Pat. No. 4,606,740 describes the composition and manufacture of multi-component membranes containing polyethylene glycol useful in the separation of gas mixtures. This reference also discloses the use of polysulfone supports. U.S. Pat. No. 5,127,925 describes the separation of gases by use of a mixed matrix membrane consisting of polysilicone having a solid particulate adsorbent incorporated therein. U.S. Pat. No. 6,726,744 teaches the separation of gases by using a mixed matrix membrane comprising polyethylene glycol, silicone rubber and activated carbon on a porous support. Improvements in selectivity and permeability, particularly in connection with the separation of methane and carbon dioxide are still highly desirable.

We have now discovered a novel and highly mixed matrix membrane that is particularly useful in the separation of carbon dioxide from methane and carbon dioxide from nitrogen. We have further developed a specific combination of ingredients making up a mixed matrix membrane which heretofore has not been known prior to our invention.

SUMMARY OF THE INVENTION

The subject invention is a mixed matrix membrane having improved stability and separation performance. These improvements result from the inclusion of zeolites such as sodium X or lithium X zeolites into the membranes. Optimal results were obtained with about 10% zeolite used while higher levels of zeolite had negative impact upon separation and permeance performance. Further improvements are provided by the addition of nitrogen containing compounds, such as amines to the formulation.

DETAILED DESCRIPTION OF THE INVENTION

The subject invention relates to the use of a multi-component membrane or mixed matrix membrane having improved selectivity for the separation of gases, especially for the separation of carbon dioxide from methane and carbon dioxide from nitrogen. Such membranes find utility in a variety of industrial and consumer applications as described below.

The utility of any particular membrane is closely tied to the selectivity and permeability performance factors. The ability of a membrane to separate gaseous materials is controlled by the solubility (S) of the gas into the membrane and the diffusivity (D) of the gas through the membrane. The solubility depends on the condensability of the as molecule to the membrane material and the polymer-gas interactions. Diffusivity is determined by packing and motion of the polymer segments as well as by the size and shape of the gas molecules. The permeability (P) equals S times D. The selectivity of components 1 and 2 is defined by the following equation:

Some of the normally gaseous materials which can be separated using these membranes are shown in Table 1 together with the kinetic diameter of the gas molecules. Since many of these molecules have similar diameters, it is necessary to modify membranes to enhance the separation of gases. In the present invention it has been found that adding zeolite and a nitrogen containing compound to the mixed matrix membrane increases the solubility of a desired permeate gas molecule in the composite membrane. This increases the ratio S1:S2 of the selectivity definition.

TABLE 1

| Molecule | Molecular Diameter Å |
|---|---|
| $NH_3$ | 2.6 |
| $H_2O$ | 2.65 |
| $H_2$ | 2.89 |
| $C_2H_2$ | 3.3 |
| $O_2$ | 3.46 |
| $SO_2$ | 3.6 |
| $N_2$ | 3.64 |
| CO | 3.76 |
| $CH_4$ | 3.8 |
| $C_2H_4$ | 3.9 |
| $CO_2$ | 3.94 |

In a typical membrane system, two gas components of a gas mixture are separated. For example, in feeding a gas mixture containing equal amounts of components 1 and 2 to the left hand side of a gas membrane, component 2 preferentially passes through the membrane so that the product gas exiting the bottom of the apparatus is enriched in gas component 2. In this instance, component 2 is the desired permeate molecule. A minor part of component 1 is passes through the membrane with component 2, with the majority of component 1 not passing through the membrane. The dispersed zeolite in the polymer phase, which is the origin of the term "mixed-matrix membrane", increases the selectivity for component 2. Since the zeolite is not intended to act as an adsorbent, its selectivity for the desired permeate need not be very strong. While it should be selective for the desired permeate, a strong selectivity as an adsorbent results in little contribution by the zeolite to the mixed matrix membrane.

In the manufacture of the mixed matrix membranes of this invention, the membrane is a combination of the solid polymer and the liquid polymer mixed matrix membrane. A mixture of the nitrogen containing compound, an optional plasticizer and solid zeolite particles are dispersed in the silicone rubber which forms a layer. This layer rests upon the cellulose acetate fabric that provides strength and form to the membrane. The cellulose acetate fabric is porous, having numerous small openings through it. The membrane media bridges these openings to present a solid layer which resists gas flow.

The membrane may contain a plasticizer such as a glycol plasticizer having a molecular weight of from about 200 to 600. Preferably, this glycol plasticizer is polyethylene glycol (PEG). Other glycol plasticizers that are suitable include tetraethylene glycol, propylene glycol, propylene glycol, diethylene glycol, triethylene glycol, ethylene glycol, dipropylene glycol and polypropylene glycol.

The nitrogen-containing compound used according to the present invention has the following general formula:

$$NR^1R^2R^3$$

where $R^1$, $R^2$ and $R^3$ independently are one or more of the following groups: $C_1$-$C_{50}$-alkyl, $C_3$-$C_{50}$-cycloalkyl, aromatic, alkyl substituted aromatic, such as $C_1$-$C_{50}$-alkyl substituted aromatic, aromatic substituted aliphatic moieties such as $C_1$-$C_{50}$-alkylene moieties substituted with one or more aromatic groups, $C_1$-$C_{50}$-hydroxyalkyl, amino- and/or hydroxyl-substituted $C_1$-$C_{50}$-alkyl, alkoxyalkyl such as $C_2$-$C_{50}$-alkoxyalkyl, dialkylaminoalkyl such as $C_3$-$C_{50}$-dialkylaminoalkyl, alkylaminoalkyl such as $C_2$-$C_{50}$-alkylaminoalkyl, heterocyclic, aromatic heterocyclic, alkyl substituted heterocyclic and alkyl substituted aromatic heterocyclic, such as $C_1$-$C_{50}$-alkyl substituted heterocyclic and aromatic heterocyclic compounds, and heterocyclic substituted aliphatic moieties such as $C_1$-$C_{50}$-alkylene moieties substituted with one or more aromatic groups. In addition, $R^1$ and $R^2$ may independently be hydrogen. The nitrogen-containing compound is not ammonia. When $R^3$ is alkyl and $R^1$ and $R^2$ are independently hydrogen then $R^3$ is $C_4$-$C_{50}$-alkyl. $R^1$ and $R^2$ may form, with the nitrogen atom, a nitrogen-containing heterocycle, aromatic heterocycle, alkyl substituted heterocycle or alkyl substituted aromatic heterocycle.

Examples of alkyl groups include; methyl, ethyl, n-propyl, isopropyl, n-butyl, isobutyl, sec-butyl, tert-butyl, n-pentyl, isopentyl, sec-pentyl, neopentyl, 1,2-dimethylpropyl, n-hexyl, isohexyl, sec-hexyl, n-heptyl, isoheptyl, n-octyl, isooctyl, 2-ethylhexyl, n-decyl, 2-n-propyl-n-heptyl, n-tridecyl, 2-n-butyl-n-nonyl and 3-n-butyl-n-nonyl, particularly preferably ethyl, isopropyl, 2-ethylhexyl, n-decyl, 2-n-propyl-n-heptyl, n-tridecyl, 2-n-butyl-n-nonyl and 3-n-butyl-n-nonyl, and $C_{40}$-$C_{200}$-alkyl such as polybutyl, polyisobutyl, polypropyl, polyisopropyl and polyethyl. The most preferred aliphatic amines are aliphatic amines having one or more alkyl groups having 1 to 20 carbon atoms, more preferably 2 to 14 carbon atoms, and most preferably 4 to 14 carbon atoms. Examples of specific aliphatic amines include heptylamine, decylamine, trimethylamine and triethylamine.

Examples of cycloalkyl groups include $C_3$-$C_{12}$-cycloalkyl, preferably $C_3$-$C_8$-cycloalkyl such as cyclopropyl, cyclobutyl, cyclopentyl, cyclohexyl, cycloheptyl and cyclooctyl.

Examples of aromatic groups include; phenyl, 1-naphthyl, 2-naphthyl, 1-anthryl, 2-anthryl and 9-anthryl, 1-phenanthryl, 2-phenanthryl, 3-phenanthryl, 4-phenanthryl and 9-phenanthryl.

Examples of alkyl substituted aromatic groups include $C_7$-$C_{50}$ alkyl aromatic groups, preferably $C_7$-$C_{40}$-alkylphenyl such as 2-nonylphenyl, 3-nonylphenyl, 4-nonylphenyl, 2-decylphenyl, 3-decylphenyl, 4-decylphenyl, 2,3-dinonylphenyl, 2,4-dinonylphenyl, 2,5-dinonylphenyl, 3,4-dinonylphenyl, 3,5-dinonylphenyl, 2,3-didecylphenyl, 2,4-didecylphenyl, 2,5-didecylphenyl, 3,4-didecylphenyl and 3,5-didecylphenyl, more preferably $C_7$-$C_{12}$ alkylphenyl such as 2-methylphenyl, 3-methylphenyl, 4-methylphenyl, 2,4-dimethylphenyl, 2,5-dimethylphenyl, 2,6-dimethylphenyl, 3,4-dimethylphenyl, 3,5-dimethylphenyl, 2,3,4-trimethylphenyl, 2,3,5-trimethylphenyl, 2,3,6-trimethylphenyl, 2,4,6-trimethylphenyl, 2-ethylphenyl, 3-ethylphenyl, 4-ethylphenyl, 2-n-propylphenyl, 3-n-propylphenyl and 4-n-propylphenyl.

Examples of aromatic substituted aliphatic moieties include $C_7$-$C_{50}$ alkylene moieties substituted with one or more aromatic substituents, preferably $C_7$-$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl, 1-phenethyl and 2-phenethyl.

Examples of hydroxyalkyl groups include $C_1$-$C_{50}$-hydroxyalkyl, preferably $C_1$-$C_8$-hydroxyalkyl, particularly preferably $C_1$-$C_4$-hydroxyalkyl such as hydroxymethyl, 1-hydroxyethyl, 2-hydroxyethyl, 1-hydroxy-n-propyl, 2-hydroxy-n-propyl, 3-hydroxy-n-propyl and 1-hydroxy-methylethyl.

Examples of amino- and hydroxy alkyl groups include $C_1$-$C_{50}$-alkyl, preferably amino- and/or hydroxyl-substituted $C_1$-$C_8$-alkyl, particularly preferably amino and/or hydroxyl-substituted $C_1$-$C_4$-alkyl such as N-(hydroxyethyl)aminoethyl and N-(aminoethyl)aminoethyl.

Examples of alkoxyalkyl groups include $C_2$-$C_{50}$-alkoxyalkyl, preferably $C_2$-$C_{20}$-alkoxyalkyl, particularly preferably $C_2$-$C_8$-alkoxyalkyl such as methoxymethyl, ethoxymethyl, n-propoxymethyl, isopropoxymethyl, n-butoxymethyl, isobutoxymethyl, sec-butoxymethyl, tert-butoxymethyl, 1-methoxyethyl and 2-methoxyethyl, particularly preferably $C_2$-$C_4$-alkoxyalkyl such as methoxymethyl, ethoxymethyl, n-propoxymethyl, isopropoxymethyl, n-butoxymethyl, isobutoxymethyl, sec-butoxymethyl, tert-butoxymethyl, 1-methoxyethyl and 2-methoxyethyl.

Examples of dialkylamino groups include $C_3$-$C_{50}$-dialkylaminoalkyl, preferably $C_3$-$C_{20}$-dialkylaminoalkyl, particularly preferably $C_3$-$C_{10}$-dialkylaminoalkyl such as dimethylaminomethyl, dimethylaminoethyl, diethylaminoethyl, di-n-propylaminoethyl and diisopropylaminoethyl.

Examples of alkylaminoalkyl groups include $C_2$-$C_{50}$-alkylaminoalkyl, preferably $C_2$-$C_{20}$-alkylaminoalkyl, particularly preferably $C_2$-$C_8$-alkylaminoalkyl such as methylaminomethyl, methylaminoethyl, ethylaminomethyl, ethylaminoethyl and iso-propylaminoethyl.

Examples of aromatic heterocycles include 2-pyridinyl, 3-pyridinyl, 4-pyridinyl, pyrazinyl, 3-pyrrolyl, 2-imidazolyl, 2-furanyl and 3-furanyl. Examples of alkyl substituted aromatic heterocycles include $C_4$-$C_{50}$-mono-hetarylalkyl, such as 2-pyridylmethyl, 2-furanyl-methyl, 3-pyrrolylmethyl and 2-imidazolylmethyl, and $C_4$-$C_{50}$-alkylhetaryl such as 2-methyl-3-pyridinyl, 4,5-dimethyl-2-imidazolyl, 3-methyl-2-furanyl and 5-methyl-2-pyrazinyl.

Examples of alkylaminoalkyl groups include $C_2$-$C_{50}$-alkylaminoalkyl, preferably $C_2$-$C_{16}$-alkylaminoalkyl such as methylaminomethyl, methylaminoethyl, ethylaminomethyl, ethylaminoethyl and isopropylaminoethyl.

Examples of dialkylaminoalkyl groups include $C_3$-$C_{50}$-dialkylaminoalkyl, preferably $C_3$-$C_{16}$-dialkylaminoalkyl such as dimethylaminomethyl, dimethylaminoethyl, diethylaminoethyl, di-n-propylaminoethyl and diisopropylaminoethyl.

Examples of heterocyclic compounds, include pyridine, pyrrole, imidazole, oxazole, thiazole, pyrazole, 3-pyrroline, pyrrolidine, pyrimidine, and substituted examples of these heterocyclic compounds.

Examples of organonitrile compounds include acrylonitrile, alkyl nitrites such as for example methyl nitrile, and ethyl nitrile. Among the useful amines are monoethanolamine, diethanolamine, ethylene diamine and triethylene tetramine.

The membrane also contains a silicone rubber (SIL). The silicone rubber can be described as forming an emulsion with the plasticizer, with the plasticizer being dispersed in the silicone rubber.

The membrane contains from about 5 to 50% of the nitrogen containing compounds and from about 40 to 85% silicone rubber. A preferred range of nitrogen containing compound content is from about 10 to 30%. A preferred range of silicone rubber content is from about 60 to 80%. All percentages referred to herein are weight percent unless otherwise specified.

The membranes of the present invention contain a zeolite component such as an X or Y type zeolite. Zeolites that are particularly useful include sodium X, sodium Y, potassium X, potassium Y, calcium X, calcium Y, lithium X and lithium Y. The preferred zeolites are sodium or lithium X type zeolites. This zeolite component is present as undissolved small particles dispersed throughout the cast portion of the membrane. The membrane should contain about 1 to 40% zeolite. A preferred range of zeolite content is 5 to 25%. If the amount of zeolite is too low, then the permeability and selectivity of the membrane is not improved sufficiently and if the amount of zeolite is too high there can be processability and structural problems. It is preferred that the zeolite has a particle size between 0.1 and 5 microns, with a broad particle size distribution ranging from 0.1 to 200 microns.

As shown by the test results presented below, the presence of zeolites in the silicone rubber—plasticizer membrane improves selectivity for gas separations. The zeolites may also improve stability. Stability of the membrane is tested by separating nitrogen and then carbon dioxide, with the chosen permeate changed every 24 hours. The stability test is performed at 25° C. at a pressure across the membrane varying between 172 and 345 kPa (25 and 50 psig).

The membrane may also contain a carbonate, with both inorganic and organic carbonates suitable for inclusion. Examples of suitable carbonates include propylene carbonate, ethylene carbonate, sodium carbonate and potassium carbonates. The presence of a carbonate is beneficial when it is desired to separate carbon dioxide from a feed gas mixture such as a gas containing nitrogen, oxygen or light hydrocarbons e.g. methane. In this situation it is important that the feed gas stream contains water although the relative humidity of the feed over a range of 30 to 70% relative humidity has been found to not significantly change selectivity of the membrane for the separation of carbon dioxide from nitrogen. The feed gas stream may be saturated with water.

The membrane may be formed by mixing (stirring or shaking) the required ingredients in the presence of a suitable solvent at room temperature and then casting the membrane by spreading the liquid-phase mixed membrane media ingredients onto a porous support media by conventional methods. The membrane can also be dipped into or passed through a pool of the mixed ingredients. Excess membrane media is then removed and the remaining membrane media is allowed to cure as by exposure to an elevated temperature up to 100° C. A preferred support media is a woven or non-woven polymeric fabric which is resistant to the chemicals and temperatures to which the membrane will be exposed. Cellulose acetate, polysulfone, polyethersulfone and polyimides are such materials. Cellulose acetate is a preferred support media. The cellulose acetate may be treated by contact with a polyhedric alcohol such as ethylene glycol, catechol or propylene glycol. The preferred polyhedric alcohol is glycerol. Treating may be accomplished by exposure of the support media to the liquid polyhedric alcohol for 1 to 4 hours followed by air drying at room temperature.

In making the membrane, silicone rubber is mixed with cyclohexane solvent and a separate mixture of the nitrogen containing compound combined with and zeolites is made. Optionally, the mixture with the zeolites further contains a glycol, such as polyethylene glycol and a carbonate. These two mixtures are then mixed together to form a cast solution which is then cast upon a support media such as the treated porous polysulfone. The cast solution after being cast is then cured in hot air.

In preferred embodiments of the invention, the zeolites are added to the silicon rubber prior to adding the plasticizer. Such addition is in the presence of a suitable solvent. Fluorinated hydrocarbons such as trifluorotrichloroethane have been used as solvents, but due to environmental concerns, a nonfluorinated hydrocarbon such as cyclohexane is preferred. The solvent is used in an amount which gives a workable mixture suitable for casting. A solvent content in the range of from 80 to 95% is normally suitable. The solvent is removed from the membrane during the curing step. U.S. Pat. No. 4,606,740 is incorporated herein for its teaching as to the method of manufacture of membranes. The resultant layer of membrane media is preferably about 30 mils thick (one mil equals 0.001 inch). The thickness of the layer can vary as desired.

The membrane of the subject invention can accordingly be characterized as a multi-component membrane for the separation of gases, the membrane comprising a mixture of a nitrogen containing compound, silicone rubber and a zeolite particulate solid support for the plasticizer suspended in a uniform thickness layer on a porous support media.

The gases that can be separated by the membranes of the present invention include oxygen and nitrogen. An important application of the present invention is in the removal of carbon dioxide from natural gas resulting in higher purity methane. Carbon dioxide can also be removed from nitrogen or light olefins can be separated from light paraffins using these membranes. The membranes can also be used to separate nitrogen from other gas mixtures including the separation of nitrogen or hydrogen from gaseous hydrocarbon mixtures containing methane, ethane and similar light hydrocarbons, as for example a natural gas stream. The membranes can be used in the production of relatively pure oxygen or nitrogen as may be useful in medical or industrial applications. They can be used in the preparation of the feed stream to a cryogenic gas separation process producing nitrogen and/or oxygen or in combination with a pressure swing adsorption (PSA) unit. The membrane can be used to prepare the feed to the PSA unit or to process an effluent of a PSA unit as to produce a recycle stream.

Membranes prepared in accordance with the present invention can also be useful in the separation of polar and non-polar gases. Therefore, such membranes are useful in separating gas mixtures containing hydrogen sulfide, carbon dioxide, carbon monoxide, sulfur dioxide, ammonia, hydrogen and others. The membrane then finds utility in removing pollutants or other compounds from combustion products such as flue gas streams.

The membrane used in the tests described below were produced by admixing about 15% silicone rubber, 80% cyclohexane solvent and in some examples 5% PEG. An indicated amount of other ingredients were also added as shown in the tables.

In the following examples, the permeance or thickness normalized permeation rate of various gases was determined. The gases used included carbon dioxide, methane, nitrogen and mixtures of carbon dioxide/methane and carbon dioxide/nitrogen.

EXAMPLE 1

The selectivities for silicone rubber and solid/silicone rubber mixed matrix membranes which contained either activated carbon, NaX zeolites or LiX zeolites were determined with the amount of solid being at various loadings of 10, 20 and 30 wt % as well as control samples without any added solid. The selectivities were determined from the steady state permeation rates of each gas through the membrane at room temperature and feed pressure of 50 psia. In Table 2 is presented this data of the gas permeation rate selectivity of $CO_2/CH_4$ and $CO_2/N_2$ from silicone rubber/cellulose acetate, activated carbon/silicone rubber/cellulose acetate, NaX/silicone rubber/cellulose acetate, and LiX/silicone rubber/cellulose acetate mixed matrix membranes.

TABLE 2

| MMM | Gas permeance (GPU) | | | Selectivity | |
| --- | --- | --- | --- | --- | --- |
| | $CO_2$ | $CH_4$ | $N_2$ | $CO_2/CH_4$ | $CO_2/N_2$ |
| CA[1] | 176.86 | 21.12 | 21.22 | 8.37 | 8.34 |
| SR/CA[2] | 21.58 | 1.64 | 1.32 | 13.17 | 16.32 |
| 10% AC/SR/CA[3] | 26.54 | 2.61 | 1.81 | 10.19 | 14.70 |
| 20% AC/SR/CA[3] | 30.06 | 2.24 | 1.63 | 13.44 | 18.46 |
| 30% AC/SR/CA[3] | 21.29 | 1.74 | 1.55 | 12.26 | 13.72 |
| 10% NaX/SR/CA[3] | 38.50 | 2.39 | 1.49 | 16.14 | 25.89 |
| 20% NaX/SR/CA[3] | 19.88 | 1.68 | 1.33 | 11.84 | 14.97 |
| 30% NaX/SR/CA[3] | 15.48 | 1.28 | 1.00 | 12.09 | 15.47 |
| 10% LiX/SR/CA[3] | 28.95 | 1.99 | 1.46 | 14.57 | 19.84 |
| 20% LiX/SR/CA[3] | 20.12 | 1.68 | 1.38 | 12.00 | 14.59 |
| 30% LiX/SR/CA[3] | 13.72 | 1.48 | 1.27 | 9.26 | 10.79 |

Note:
[1]CA is porous cellulose acetate.
[2]SR/CA is silicone rubber cast upon cellulose acetate
[3]X% solid/SR/CA is X% solid with silicone rubber cast upon cellulose acetate where X is 10, 20 or 30 and the solid is activated carbon (AC), sodium X zeolites (NaX) or lithium X zeolites (LiX).
% solid was calculated with respect to the total weight of solid and silicone rubber
GPU = 1 * $10^{-6}$ $cm^3$ (STP)/$cm^2$ sec cm Hg The incorporation of activated carbon into silicone rubber/cellulose acetate membranes primarily affected the carbon dioxide permeation rate, while the rate for $CH_4$ and $N_2$ were not significantly changed as compared to the membrane without activated carbon. However, $CO_2$ permeance reached a maximum at 20% activated carbon levels and 10% sodium X or lithium zeolite levels. The zeolites provided the best selectivity at 10 wt % while the activated carbon did not show an improvement to selectivity.

EXAMPLE 2

In Example 2, liquid polyethylene glycol (PEG) was added to the zeolite or activated carbon particles prior to addition to the matrix. PEG was incorporated at various loadings of 10, 20, and 30 wt %, with respect to the weight of the solid components in the mixed matrix membranes. It was found as shown in the data reported in Table 3 that adsorbing the liquid PEG into the solid components prior to mixing provides a way to prevent leakage of PEG liquid.

TABLE 3

| MMM | Gas permeance (GPU) | | | Selectivity | |
|---|---|---|---|---|---|
| | $CO_2$ | $CH_4$ | $N_2$ | $CO_2/CH_4$ | $CO_2/N_2$ |
| 20% AC/SR/CA | 30.06 | 2.24 | 1.63 | 13.44 | 18.46 |
| 10% PEG/20% AC/SR/CA[4] | 20.97 | 2.41 | 1.39 | 8.72 | 15.07 |
| 20% PEG/20% AC/SR/CA[4] | 17.61 | 1.12 | 0.68 | 15.72 | 25.91 |
| 30% PEG/20% AC/SR/CA[4] | 14.93 | 0.92 | 0.49 | 16.24 | 30.34 |
| 10% NaX/SR/CA | 38.50 | 2.39 | 1.49 | 16.14 | 25.89 |
| 10% PEG/10% NaX/SR/CA[5] | 17.06 | 0.68 | 0.59 | 24.97 | 29.04 |
| 20% PEG/10% NaX/SR/CA[5] | 11.47 | 0.31 | 0.33 | 37.27 | 35.12 |
| 30% PEG/10% NaX/SR/CA[5] | 8.69 | 0.18 | 0.19 | 47.38 | 45.78 |
| 10% LiX/SR/CA | 28.95 | 1.99 | 1.46 | 14.57 | 19.84 |
| 10% PEG/10% LiX/SR/CA[6] | 14.93 | 0.64 | 0.50 | 23.33 | 29.96 |
| 20% PEG/10% LiX/SR/CA[6] | 9.13 | 0.26 | 0.19 | 34.66 | 47.61 |
| 30% PEG/10% LiX/SR/CA[6] | 8.26 | 0.19 | 0.21 | 42.74 | 40.00 |

TABLE 4

Gas permeation rate and selectivity of $CO_2/CH_4$ and $CO_2/N_2$ for various PEG/NaX/SR/CA Mixed Matrix Membranes and PEG/LiX/SR/CA Mixed Matrix Membranes

| MMM | Gas permeance (GPU) | | | Selectivity | |
|---|---|---|---|---|---|
| | $CO_2$ | $CH_4$ | $N_2$ | $CO_2/CH_4$ | $CO_2/N_2$ |
| 30% PEG/5% NaX/SR/CA[7] | 6.47 | 0.15 | 0.14 | 43.35 | 46.69 |
| 30% PEG/10% NaX/SR/CA[7] | 8.69 | 0.17 | 0.17 | 52.37 | 50.09 |
| 30% PEG/15% NaX/SR/CA[7] | 8.07 | 0.13 | 0.13 | 64.53 | 60.65 |
| 30% PEG/20% NaX/SR/CA[7] | 3.38 | 0.09 | 0.09 | 36.03 | 36.03 |
| 30% PEG/30% NaX/SR/CA[7] | 1.62 | 0.10 | 0.07 | 17.01 | 22.54 |
| 30% PEG/5% LiX/SR/CA[8] | 9.77 | 0.24 | 0.24 | 40.41 | 40.14 |
| 30% PEG/10% LiX/SR/CA[6] | 8.26 | 0.19 | 0.21 | 42.74 | 40.00 |
| 30% PEG/15% LiX/SR/CA[8] | 5.13 | 0.14 | 0.11 | 36.58 | 45.52 |
| 30% PEG/20% LiX/SR/CA[8] | 3.50 | 0.17 | 0.10 | 20.56 | 36.01 |
| 30% PEG/30% LiX/SR/CA[8] | 3.08 | 0.16 | 0.10 | 19.73 | 32.37 |

Notes
[7]30% PEG/X% NaX/SR/CA = 30% polyethylene glycol/X% NaX with silicone rubber cast on cellulose acetate where X = 5, 10, 15, 20, 30
[8]30% PEG/X% LiX/SR/CA = 30% polyethylene glycol/X% LiX with silicone rubber cast on cellulose acetate where X = 5, 10, 15, 20, 30
% PEG was calculated respect to the total weight of solid PEG
% solid was calculated respect to the total weight of silicone rubber and solid
GPU = $1 * 10^{-6}$ cm$^3$ (STP)/cm$^2$ · sec · cmHg In addition to glycols, it was found that nitrogen containing compounds such as the amine, diethanolamine could be used in the present invention to favorable results. These results were more significant in combination with the zeolites as compared with the activated carbon examples.

TABLE 5

Gas permeation rate and selectivity of $CO_2/CH_4$ and $CO_2/N_2$ for DEA/20% AC/SR/CA MMMs, DEA/10% NaX/SR/CA MMMs and DEA/10% LiX/SR/CA MMMs

| MMM | Gas permeance (GPU) | | | Selectivity | |
|---|---|---|---|---|---|
| | $CO_2$ | $CH_4$ | $N_2$ | $CO_2/CH_4$ | $CO_2/N_2$ |
| 20% AC/SR/CA | 30.06 | 2.24 | 1.63 | 13.44 | 18.46 |
| 10% DEA/20% AC/SR/CA[9] | 24.17 | 2.73 | 1.41 | 8.86 | 17.18 |
| 20% DEA/20% AC/SR/CA[9] | 22.48 | 2.32 | 1.30 | 9.67 | 17.23 |
| 30% DEA/20% AC/SR/CA[9] | 21.51 | 1.80 | 1.05 | 11.98 | 20.43 |
| 10% NaX/SR/CA | 38.50 | 2.39 | 1.49 | 16.14 | 25.89 |
| 10% DEA/10% NaX/SR/CA[10] | 35.85 | 2.29 | 1.62 | 15.64 | 22.07 |
| 20% DEA/10% NaX/SR/CA[10] | 25.44 | 1.35 | 1.09 | 18.78 | 23.45 |
| 30% DEA/10% NaX/SR/CA[10] | 23.53 | 1.02 | 0.86 | 23.00 | 27.50 |
| 10% LiX/SR/CA | 28.95 | 1.99 | 1.46 | 14.57 | 19.84 |
| 10% DEA/10% LiX/SR/CA[11] | 28.15 | 1.00 | 1.12 | 28.07 | 25.22 |
| 20% DEA/10% LiX/SR/CA[11] | 23.29 | 0.82 | 0.80 | 28.53 | 28.97 |
| 30% DEA/10% LiX/SR/CA[11] | 23.44 | 0.72 | 0.75 | 32.54 | 31.10 |

Notes
[9]X% DEA/20% AC/SR/CA = X% diethanolamine/20% activated carbon with silicone rubber casted on cellulose acetate where X = 10, 20, 30
[10]X% DEA/10% NaX/SR/CA = X% diethanolamine/10% NaX with silicone rubber casted on cellulose acetate where X = 10, 20, 30
[11]X% DEA/10% LiX/SR/CA = X% diethanolamine/10% LiX with silicone rubber casted on cellulose acetate where X = 10, 20, 30
% DEA was calculated respect to the total weight of solid and DEA
% solid was calculated respect to the total weight of silicone rubber and solid
GPU = $1 * 10^{-6}$ cm$^3$ (STP)/cm$^2$ · sec · cmHg It was found that the gas permeation rate decreased as the percentage of diethanolamine increased. However, the selectivity increased, due to the use of the zeolites.

The membranes must be used at appropriate separation promoting conditions. The preferred embodiments of the subject membrane have been tested at separation promoting conditions ranging in temperatures ranging from 20° to 100° C. A positive pressure gradient across the membrane is needed to drive the passage of the gases through the membrane. A pressure differential above 172 kPa (25 psig) is preferred. The pressure differential across the membrane is limited by the strength of the membrane. This contrasts with the absolute operating pressure of the membrane which is limited only by the strength of the equipment which encloses the membranes.

The membranes of the present invention can be used in place of prior art membranes in separation equipment of conventional design. The amount of permeate recovered is proportional to the area of membrane used and therefore equipment designs which provide large surface areas such as spiral wound tube bundles or bundles containing a large number of small diameter (hollow fiber) tubes are preferred.

What is claimed is:
1. A multi-component membrane for the separation of gases, the membrane comprising a mixture of silicone rubber, zeolite particles and a nitrogen containing compound on a cellulose acetate porous support media wherein said nitrogen containing compound is of a general formula:

$NR^1R^2R^3$ wherein $R^1$, $R^2$ and $R^3$ may independently one or more of the following groups: $C_1$-$C_{50}$-alkyl, $C_3$-$C_{50}$-cycloalkyl, aromatic, alkyl substituted aromatic, such as $C_1$-$C_{50}$-alkyl substituted aromatic, aromatic substituted aliphatic moieties such as $C_1$-$C_{50}$-alkylene moieties substituted with one or more aromatic groups, $C_1$-$C_{50}$-hydroxyalkyl, amino- and/or hydroxyl-substituted $C_1$-$C_{50}$-alkyl, alkoxyalkyl such as $C_2$-$C_{50}$-alkoxyalkyl, dialkylaminoalkyl such as $C_3$-$C_{50}$-dialkylaminoalkyl, alkylaminoalkyl such as $C_2$-$C_{50}$-alkylaminoalkyl, heterocyclic, aromatic heterocyclic, alkyl substituted heterocyclic and alkyl substituted aromatic heterocyclic, such as $C_1$-$C_{50}$-alkyl substituted heterocyclic and aromatic heterocyclic compounds, and heterocyclic substituted aliphatic moieties such as $C_1$-$C_{50}$-alkylene moieties substituted with one or more aromatic groups and $R^1$ and $R^2$ may independently be hydrogen and $R^1$ and $R^2$ may form, with the nitrogen atom, a nitrogen-containing heterocycle, aromatic heterocycle, alkyl substituted heterocycle or alkyl substituted aromatic heterocycle, with the proviso that when $R^3$ is alkyl and $R^1$ and $R^2$ are independently hydrogen then $R^3$ is $C_4$-$C_{50}$-alkyl.

2. The multi-component membrane of claim 1 wherein the zeolite particles comprise one or more zeolites selected from the group consisting of sodium X, sodium Y, potassium X, potassium Y, calcium X, calcium Y, lithium X and lithium Y zeolite.

3. The multi-component membrane of claim 1 wherein the zeolite particles comprise lithium X or sodium X zeolite.

4. The multi-component membrane of claim 1 further comprising a plasticizer.

5. The multi-component membrane of claim 1 wherein said plasticizer is selected from the group consisting of polyethylene glycol, tetraethylene glycol, triethylene glycol, diethylene glycol, propylene glycol, dipropylene glycol, ethylene glycol and polypropylene glycol.

6. The multi-component membrane of claim 4 wherein said plasticizer is polyethylene glycol.

7. The multi-component membrane of claim 1 comprising 10-30 wt % of said zeolite particles.

8. The multi-component membrane of claim 1 wherein said nitrogen containing compound comprises an amine selected from the group consisting of monoethanolamine, diethanolamine, ethylene diamine and triethylene tetramine.

9. A process for separating a gas mixture comprising contacting a pressurized gas mixture with a multi-component membrane comprising a mixture of silicone rubber, zeolite particles and a nitrogen containing compound on a cellulose acetate porous support media wherein said nitrogen containing compound is of a general formula:

wherein $R^1$, $R^2$ and $R^3$ may independently one or more of the following groups: $C_1$-$C_{50}$-alkyl, $C_3$-$C_{50}$-cycloalkyl, aromatic, alkyl substituted aromatic, such as $C_1$-$C_{50}$-alkyl substituted aromatic, aromatic substituted aliphatic moieties such as $C_1$-$C_{50}$-alkylene moieties substituted with one or more aromatic groups, $C_1$-$C_{50}$-hydroxyalkyl, amino- and/or hydroxyl-substituted $C_1$-$C_{50}$-alkyl, alkoxyalkyl such as $C_2$-$C_{50}$-alkoxyalkyl, dialkylaminoalkyl such as $C_3$-$C_{50}$-dialkylaminoalkyl, alkylaminoalkyl such as $C_2$-$C_{50}$-alkylaminoalkyl, heterocyclic, aromatic heterocyclic, alkyl substituted heterocyclic and alkyl substituted aromatic heterocyclic, such as $C_1$-$C_{50}$-alkyl substituted heterocyclic and aromatic heterocyclic compounds, and heterocyclic substituted aliphatic moieties such as $C_1$-$C_{50}$-alkylene moieties substituted with one or more aromatic groups and $R^1$ and $R^2$ may independently be hydrogen and $R^1$ and $R^2$ may form, with the nitrogen atom, a nitrogen-containing heterocycle, aromatic heterocycle, alkyl substituted heterocycle or alkyl substituted aromatic heterocycle, with the proviso that when $R^3$ is alkyl and $R^1$ and $R^2$ are independently hydrogen then $R^3$ is $C_4$-$C_{50}$-alkyl.

10. The process of claim 9 wherein said multi-component membrane further comprises a plasticizer selected from the group consisting of polyethylene glycol, tetraethylene glycol, triethylene glycol, diethylene glycol, propylene glycol, dipropylene glycol, ethylene glycol and polypropylene glycol.

11. The process of claim 9 wherein the zeolite particles comprise one or more zeolites selected from the group consisting of sodium X, sodium Y, potassium X, potassium Y, calcium X, calcium Y, lithium X and lithium Y zeolite.

12. The process of claim 9 wherein the zeolite particles comprise lithium X or sodium X zeolite.

13. The process of claim 9 wherein said multi-component membrane comprises 10-30 wt % of said zeolite particles.

14. The process of claim 9 wherein said nitrogen containing compound comprises an amine selected from the group consisting of monoethanolamine, diethanolamine, ethylene diamine and triethylene tetramine.

15. The process of claim 9 wherein said gas mixture comprises at least two gases from the group consisting of methane, nitrogen, carbon dioxide, sulfur dioxide, ammonia, hydrogen sulfide, hydrogen and oxygen.

16. The process of claim 9 wherein said gas mixture comprises methane and carbon dioxide.

17. The process of claim 9 wherein said gas mixture comprises nitrogen and carbon dioxide.

* * * * *